(12) United States Patent
Dai et al.

(10) Patent No.: US 11,483,024 B2
(45) Date of Patent: Oct. 25, 2022

(54) PRECEDING FOR ASYMMETRIC TWO-WAY ETHERNET PHYSICAL LAYER

(71) Applicant: Marvell Asia Pte, Ltd., Singapore (SG)

(72) Inventors: Shaoan Dai, San Jose, CA (US); Xing Wu, Palo Alto, CA (US); Mats Oberg, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 149 days.

(21) Appl. No.: 17/004,027

(22) Filed: Aug. 27, 2020

(65) Prior Publication Data

US 2021/0067193 A1 Mar. 4, 2021

Related U.S. Application Data

(60) Provisional application No. 62/893,070, filed on Aug. 28, 2019.

(51) Int. Cl.
| | |
|---|---|
| *H04B 1/56* | (2006.01) |
| *H04B 3/50* | (2006.01) |
| *H04L 5/14* | (2006.01) |
| *H04L 25/03* | (2006.01) |

(52) U.S. Cl.
CPC ............. *H04B 1/56* (2013.01); *H04B 3/50* (2013.01); *H04L 5/143* (2013.01); *H04L 25/03828* (2013.01)

(58) Field of Classification Search
CPC .............. H03M 13/151; H03M 13/05; H03M 13/1515; H04B 7/0456; H04L 1/0041; H04L 1/0045; H04L 25/03949; H04L 25/4917; H04L 27/02; H04L 1/0057; H04L 27/00
See application file for complete search history.

(56) References Cited

U.S. PATENT DOCUMENTS

| | | |
|---|---|---|
| 8,948,203 B1 | 2/2015 | Nolan et al. |
| 2003/0016770 A1* | 1/2003 | Trans ................. H04B 3/32 375/346 |
| 2007/0153731 A1* | 7/2007 | Fine ................... H04B 17/336 370/329 |
| 2011/0191656 A1* | 8/2011 | Bliss ................... H03M 13/05 714/776 |

(Continued)

OTHER PUBLICATIONS

IEEE Std 802.3cg-2019, "IEEE Standard for Ethernet—Amendment 5: Physical Layer Specifications and Management Parameters for 10 Mb/s Operation and Associated Power Delivery over a Single Balanced Pair of Conductors", pp. 1-256, Feb. 2020.

(Continued)

*Primary Examiner* — Dady Chery (57) ABSTRACT

An Ethernet physical layer (PHY) transceiver includes a transmitter and a receiver. The transmitter is configured to precode a first data stream by summing two or more mutually-delayed replicas of the first data stream, and to transmit the precoded first data stream over a full-duplex wired channel to a peer Ethernet PHY transceiver. The receiver is configured to receive a second data stream from the peer Ethernet PHY transceiver over the full-duplex wired channel, and to decode the received second data stream while the transmitter concurrently is transmitting the precoded first data stream.

24 Claims, 4 Drawing Sheets

(56) References Cited

U.S. PATENT DOCUMENTS

| | | | | |
|---|---|---|---|---|
| 2015/0381777 | A1* | 12/2015 | Dalmia | H04L 1/0001 370/475 |
| 2016/0219458 | A1* | 7/2016 | Kubota | H04L 1/1896 |
| 2019/0140730 | A1* | 5/2019 | Oteri | H04B 7/0417 |
| 2020/0403824 | A1 | 12/2020 | Benyamin et al. | |
| 2021/0243001 | A1 | 8/2021 | Dalmia | |
| 2022/0190875 | A1 | 6/2022 | Razavi Majomard et al. | |

OTHER PUBLICATIONS

IEEE Std 802.3bw™-2015, "IEEE Standard for Ethernet—Amendment 1: Physical Layer Specifications and Management Parameters for 100 Mb/s Operation over a Single Balanced Twisted Pair Cable (100BASE-T1)," pp. 1-88, Mar. 2016.

IEEE Std 802.3bp-2016, "IEEE Standard for Ethernet—Amendment 4: Physical Layer Specifications and Management Parameters for 1 GB/s Operation over a Single Twisted-Pair Copper Cable", pp. 1-211, Sep. 2016.

IEEE Std 802.3ch-2020, "IEEE Standard for Ethernet—Amendment 8: Physical Layer Specifications and Management Parameters for 2.5 GB/s, 5 GB/s and 10 GB/s Automotive Electrical Ethernet," pp. 1-207, Jun. 2020.

Benyamin et al., U.S. Appl. No. 16/419,643, filed May 22, 2019.

Wu et al., U.S. Appl. No. 16/815,299, filed Mar. 11, 2020.

International Standard ISO/IEC11801, "Information Technology—Generic Cabling for Customer Premises," second edition, Sep. 2002, International Organization for Standardization, pp. 1-140, year 2004.

Barrass et al, "10GBASE-T: 10 Gigabit Ethernet over Twisted-Pair Copper," Ethernet Alliance, version 1.0, pp. 1-44, Aug. 2007.

Jones, "10GBASE-T Tutorial Overview," Institute for Electrical and Electronics Engineering, Interim, pp. 1-34, Jan. 2003.

Muller et al., "IEEE 802 10GBASE-T Tutorial—Overview," Institute for Electrical and Electronics Engineering, pp. 1-56, Nov. 2003.

Unberboeck, "10GBASE-T: 10Gbits/s Ethernet over Copper," Broadcom, pp. 1-23, Sep. 2006.

IEEE Std 802.3ak-2004, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Physical Layer and Management Parameters for 10 GB/s Operation, Type 10GBASE—CX4," pp. 1-56, Mar. 1, 2004.

IEEE Std 802.3an-2006, "IEEE Standard for Information Technology—Telecommunications and Information Exchange etween Systems—Local and Metropolitan Area Networks—Specific Requirements—Part 3: Carrier Sense Multiple Access with Collision Detection (CSMA/CD) Access Method and Physical Layer Specification—Amendment: Physical Layer and Management Parameters for 10 GB/s Operation, Type 10GBASE-T," pp. 1-181, Sep. 1, 2006.

IEEE Std 802.3ae-2002, "IEEE Standard for Information Technology—Telecommunications and Information Exchange etween Systems—Local and Metropolitan Area Networks—Specific Requirements—Part 3: Carrier Sense Multiple Access with Collision Detection (CSMA/CD) Access Method and Physical Layer Specification—Amendment: Media Access Control (MAC) Parameters, Physical Layers, and Management Parameters for 10 GB/s Operation," pp. 1-529, Aug. 30, 2002.

\* cited by examiner

PRECEDING FOR ASYMMETRIC TWO-WAY ETHERNET PHYSICAL LAYER

CROSS-REFERENCE TO RELATED APPLICATIONS

This application claims the benefit of U.S. Provisional Patent Application 62/893,070, filed Aug. 28, 2019, whose disclosure is incorporated herein by reference.

FIELD OF THE DISCLOSURE

The present disclosure relates generally to network communication, and particularly to techniques for precoding and decoding in physical-layer (PHY) transceivers.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE Standard for Ethernet —Amendment 5: Physical Layer Specifications and Management Parameters for 10 Mb/s Operation and Associated Power Delivery over a Single Balanced Pair of Conductors," IEEE 802.3cg-2019, February, 2020; in "IEEE Standard for Ethernet Amendment 1: Physical Layer Specifications and Management Parameters for 100 Mb/s Operation over a Single Balanced Twisted Pair Cable (100BASE-T1)," IEEE 802.3bw-2015, March, 2016; in "IEEE Standard for Ethernet Amendment 4: Physical Layer Specifications and Management Parameters for 1 Gb/s Operation over a Single Twisted-Pair Copper Cable," IEEE 802.3 bp-2016, September, 2016; and in "IEEE Standard for Ethernet—Amendment 8:Physical Layer Specifications and Management Parameters for 2.5 Gb/s, 5 Gb/s, and 10 Gb/s Automotive Electrical Ethernet," IEEE 802.3ch-2020, June, 2020.

The description above is presented as a general overview of related art in this field and should not be construed as an admission that any of the information it contains constitutes prior art against the present patent application.

SUMMARY

An embodiment that is described herein provides an Ethernet physical layer (PHY) transceiver including a transmitter and a receiver. The transmitter is configured to precode a first data stream by summing two or more mutually-delayed replicas of the first data stream, and to transmit the precoded first data stream over a full-duplex wired channel to a peer Ethernet PHY transceiver. The receiver is configured to receive a second data stream from the peer Ethernet PHY transceiver over the full-duplex wired channel, and to decode the received second data stream while the transmitter concurrently is transmitting the precoded first data stream.

In an embodiment, the transmitter is configured to precode the first data stream by (i) delaying the first data stream so as to produce a delayed replica, and (ii) summing the first data stream and the delayed replica. In another embodiment, the transmitter is configured to precode the first data stream by (i) delaying the first data stream so as to produce a delayed replica, and (ii) subtracting the delayed replica from the first data stream, or the first data stream from the delayed replica.

In disclosed embodiments, the transmitter is configured to transmit the first data stream at a first data rate, and the receiver is configured to receive the second data stream at a second data rate, higher than the first data rate. In an example embodiment, the receiver is configured to receive and decode the precoded second data stream without concurrently cancelling echoes of the first data stream. In an embodiment, the transmitter and the receiver are configured to communicate the first data stream and the second data stream between electronic units in a vehicle.

There is additionally provided, in accordance with an embodiment that is described herein, an Ethernet PHY transceiver including a receiver and a transmitter. The receiver is configured to receive a first data stream from a peer Ethernet PHY transceiver over a full-duplex wired channel, wherein the first data stream is precoded using a precoding scheme that sums two or more mutually-delayed replicas of the first data stream, and to decode the received first data stream, the decoding including applying to the first data stream a decoding scheme that reverses the precoding scheme. The transmitter is configured to transmit a second data stream over the full-duplex wired channel to the peer Ethernet PHY transceiver while the receiver concurrently is receiving and decoding the first data stream.

In an embodiment, the receiver is configured to decode the first data stream by (i) delaying the first data stream by a delay element, so as to produce a delayed replica, (ii) feeding the delayed replica from an output of the delay element back to an input of the delay element, and (iii) subtracting the delayed replica from the first data stream, or the first data stream from the delayed replica. In another embodiment, the receiver is configured to decode the first data stream by (i) delaying the first data stream by a delay element, so as to produce a delayed replica, (ii) feeding the delayed replica from an output of the delay element back to an input of the delay element, and (iii) summing the delayed replica and the first data stream.

In disclosed embodiments, the receiver is configured to receive the first data stream at a first data rate, and the transmitter is configured to transmit the second data stream at a second data rate, higher than the first data rate. In an embodiment, the receiver is configured to receive and decode the precoded first data stream without concurrently cancelling echoes of the second data stream. In an example embodiment, the transmitter and the receiver are configured to communicate the first data stream and the second data stream between electronic units in a vehicle.

There is also provided, in accordance with an embodiment that is described herein, an Ethernet PHY communication method, including precoding a first data stream by summing two or more mutually-delayed replicas of the first data stream, and transmitting the precoded first data stream over a full-duplex wired channel. A second data stream is received over the full-duplex channel. The received second data stream is decoded while the precoded first data stream concurrently is transmitted.

There is further provided, in accordance with an embodiment that is described herein, an Ethernet PHY communication method, including receiving a first data stream over a full-duplex wired channel, wherein the first data stream is precoded using a precoding scheme that sums two or more mutually-delayed replicas of the first data stream. The received first data stream is decoded, the decoding including applying to the first data stream a decoding scheme that reverses the precoding scheme. A second data stream is transmitted over the full-duplex channel while the first data stream concurrently is received and decoded.

The present disclosure will be more fully understood from the following detailed description of the embodiments thereof, taken together with the drawings in which:

DETAILED DESCRIPTION OF EMBODIMENTS

Embodiments that are described herein provide improved Ethernet physical layer (PHY) transceivers and associated methods, for communication over full-duplex two-way channels, e.g., twisted-pair copper wire links. The embodiments described herein refer mainly to asymmetric links, in which the transmission bit rates differ between the two directions of the two-way link.

The asymmetric PHY transceivers described herein are useful, for example, in automotive applications, e.g., systems that collect data from sensors within a vehicle and also control and configure the sensors. The disclosed techniques are generally applicable, however, in various other applications that involve asymmetric links, for example in industrial and/or smart-home networks, as well as in video distribution systems. Certain aspects of bidirectional asymmetric Ethernet communication in such environments are addressed in U.S. patent application Ser. No. 16/419,643, entitled "Asymmetric Energy Efficient Ethernet"; and in U.S. patent application Ser. No. 16/815,299, entitled "Managing Bidirectional Communication in Constrained Environments" which are assigned to the assignee of the present patent application and whose disclosures are incorporated herein by reference.

Consider a pair of Ethernet PHY transceivers that communicate with one another in full-duplex over a single twisted-pair link. One PHY transceiver transmits at a bit rate referred to as "low speed" (LS) and receives at a bit rate referred to as "high speed" (HS). The other PHY transceiver transmits at the LS bit rate and receives at the HS bit rate. In a typical example the HS bit rate is 10 G bits per second (10 Gbps), and the LS bit rate is 100 Mbps or 10 Mbps.

In a full-duplex scenario, the signals transmitted by both PHY transceivers ae present simultaneously on the twisted-pair link. Transmission of each signal therefore is likely to interfere with reception of the other signal. This effect is referred to as an "echo". In the present context, an echo means a signal that is transmitted from a transmitter of a PHY transceiver and interferes with the receiver of the same PHY transceiver. In a given PHY transceiver, echoes may propagate from the transmitter to the receiver on various paths and a result of various leakage or reflection mechanisms.

It is possible in principle to reduce such interference using echo cancellation techniques, but echo cancellation is generally complex and increases the cost, size and power consumption of the PHY transceivers. Another possibility is to assign each direction of the link a separate frequency band, with suitable spectral separation between the bands and suitable filtering. Such a solution is complex and costly, as well, and also reduces the achievable data throughput.

The embodiments described herein obviate the need for interference cancellation or intensive filtering, and instead reduce the interference using transmitter-side precoding and receiver-side decoding. The term "precoding" means arithmetic manipulation of the input data stream at the bits level, before modulation. Typically, a precoding operation comprises summing, bit-by-bit, two or more mutually-delayed replicas of the input data stream. For example, in a precoding scheme denoted "1+D", the transmitter delays the input data by one bit to produce a delayed replica, and sums the input data and the delayed replica. In another precoding scheme, denoted "1-D", the transmitter delays the input data by one bit to produce a delayed replica, and subtracts the delayed replica from the input data (or the input data from the delayed replica). As will be shown below, an appropriately chosen precoding scheme has a spectral shaping effect similar to low-pass filtering or high-pass filtering, and therefore can be effective in interference suppression.

In some embodiments, the precoding schemes in the disclosed PHY transceivers are chosen based on the power spectra of the LS and HS signals. As such, the PHY transceiver that transmits the LS signal may use a different precoding scheme than the PHY transceiver that transmits the HS signal. In an example embodiment, the PHY transceiver that transmits the LS signal (and receives the HS signal) applies (1+D) precoding. The (1+D) precoding scheme has a Low-Pass Filtering effect on the spectrum of the transmitted LS signal, and therefore reduces interference (e.g., local echoes) that might interfere with reception of the HS signal in the PHY transceiver. In another example embodiment, the PHY transceiver that transmits the HS signal (and receives the LS signal) applies (1-D) precoding. The (1-D) precoding operation has a High-Pass Filtering effect on the spectrum of the transmitted HS signal, and therefore reduces interference that might interfere with reception of the LS signal in the PHY transceiver. Simulated examples of signal spectra can be seen in U.S. Provisional Patent Application 62/893,070, cited above, which is incorporated herein by reference in its entirety.

In summary, the disclosed techniques reduce interference in full-duplex two-way Ethernet links with low cost, size and power consumption, and with minimal performance degradation. Example PHY device implementations are described. A hybrid configuration, in which transmitter-side precoding is used only in the LS transmitter, and echo cancellation is applied in the LS receiver, is also described. In this configuration the echo cancellation operations are performed at the LS rate, and therefore incur only modest overhead.

Figure 1:
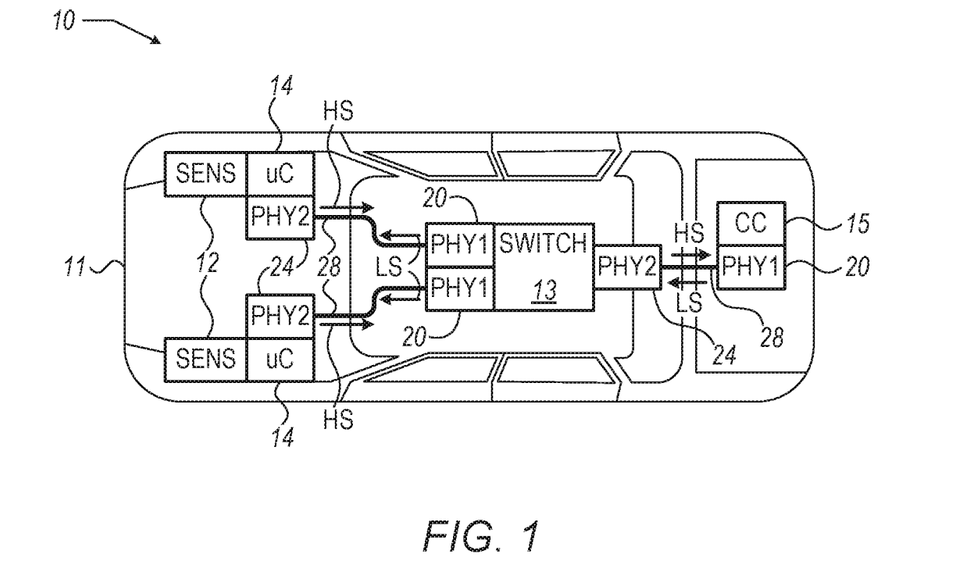
FIG. 1 is a block diagram that schematically illustrates an automotive communication system, in accordance with an embodiment that is described herein.

FIG. 1 is a block diagram that schematically illustrates an automotive communication system 10, in accordance with an embodiment that is described herein. System 10 is installed in a vehicle 11, and comprises multiple sensors 12, an Ethernet switch 13, multiple microcontrollers (µC) 14, a central controller (CC) 15, multiple Ethernet physical layer (PHY) transceivers 20 of a first type (denoted PHY1), and multiple Ethernet PHY transceivers 24 of a second type (denoted PHY1).

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

In the present example, each sensor 12 is connected to a respective microcontroller 14, which is in turn connected to a respective PHY transceiver 24. The PHY transceiver 24 of each sensor 12 is connected by a link 28 to a peer PHY transceiver 20 coupled to a port of switch 13. On the sensor side of a given link, microcontroller 14 serves as a Medium Access Control (MAC) controller. On the switch side of a given link, MAC functions are carried out by switch 13.

Automotive communication system 10 is an example use-case suitable for asymmetric Ethernet communication. Typically, sensors 12 generate large amounts of data that is sent to central computer (CC) 15 for analysis. In the opposite direction, the data typically comprises low-rate control and configuration data from CC to sensors 12. In such a scenario, asymmetric communication provides better utilization of Ethernet links 28.

In the embodiment of FIG. 1, PHY transceivers 20 (denoted PHY1) transmit at a bit rate referred to as "low speed" (LS) and receive at a bit rate referred to as "high speed" (HS). PHY transceivers 24 (denoted PHY2) transmit at the "high speed" (HS) bit rate and receive at the "low speed" (LS) bit rate. Pairs of PHY transceivers 20 and 24 communicate with one another over twisted-pair copper links 28, which serve as full-duplex wire channels. As seen in the figure, the pairs of PHY transceivers 20 and 24 are arranged so that transmission from sensors 12 to CC 15 is performed at the HS bit rate, and transmission from CC 15 to sensors 12 is performed at the LS bit rate, in an embodiment.

In one embodiment, the HS bit rate is 10 G bits per second (10 Gbps) in accordance with IEEE 802.3ch, and the LS bit rate is 100 Mbps in accordance with IEEE 802.3bw. In another embodiment, the HS bit rate is 10 Gbps in accordance with IEEE 802.3ch, and the LS bit rate is 10 Mbps in accordance with IEEE 802.3cg(10Base-T1s). In alternative embodiments, the LS bit rate and the HS bit rate may be chosen to be any other suitable bit rates. The link between PHY transceivers 20 and 24 may comprise any other two-way medium suitable for full-duplex communication.

Figure 2:
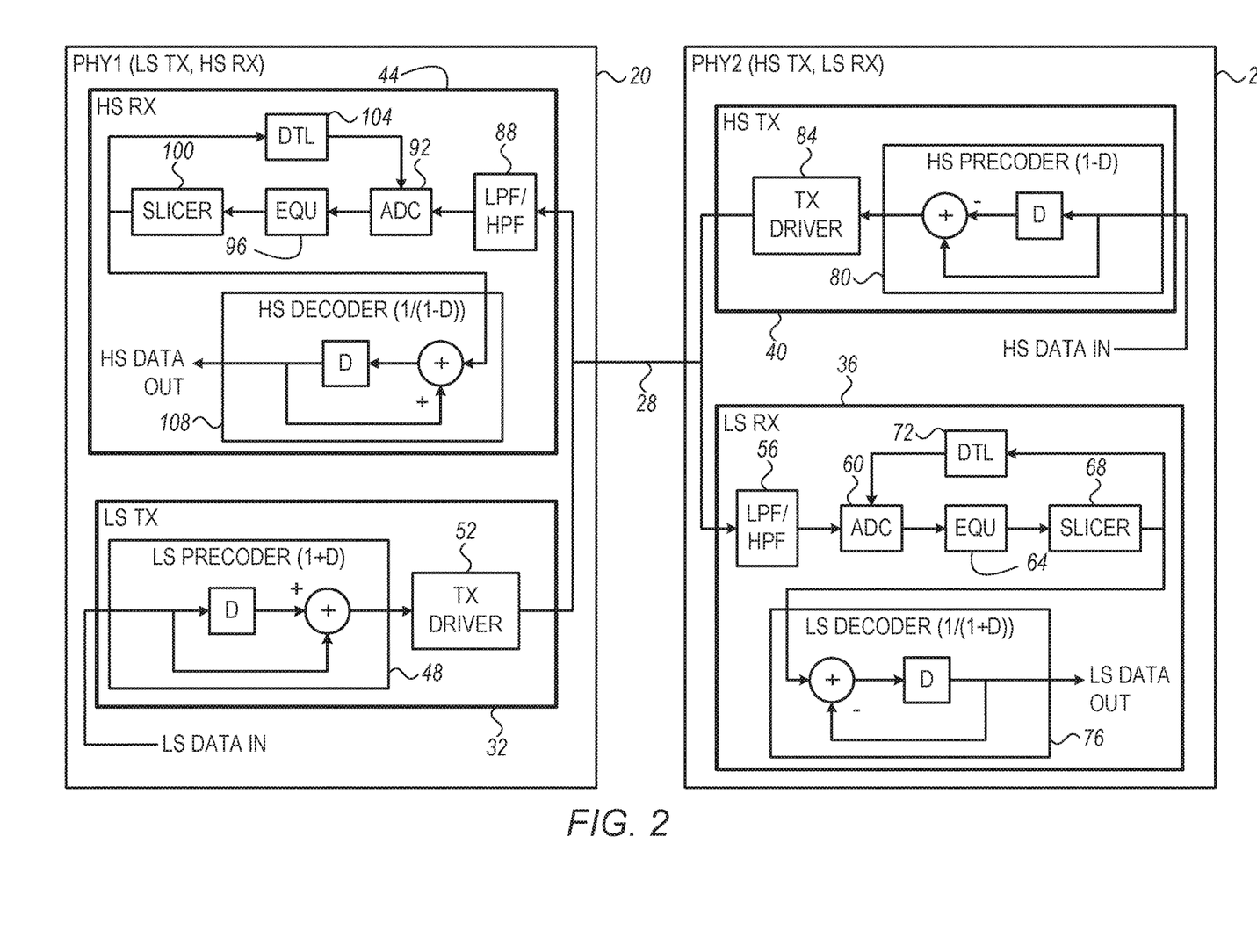
FIG. 2 is a block diagram that schematically illustrates a pair of asymmetric Ethernet physical layer (PHY) transceivers communicating over a full-duplex two-way link, in accordance with an embodiment that is described herein.

FIG. 2 is a block diagram that schematically illustrates a pair of asymmetric Ethernet physical layer (PHY) transceivers 20 and 24 of system 10, communicating over a full-duplex two-way link 28, in accordance with an embodiment that is described herein. The term "asymmetric" in the present context means that the transmission bit rates differ between the two directions of the two-way link. As noted above, PHY transceiver 20, denoted PHY1, transmits at the "low speed" (LS) bit rate and receives at the "high speed" (HS) bit rate. PHY transceiver 24, denoted PHY2, transmits at the "high speed" (HS) bit rate and receives at the "low speed" (LS) bit rate.

In the disclosed embodiments, the LS communication (PHY1 to PHY2, left-to-right in FIG. 2) and the HS communication (PHY2 to PHY1, right-to-left in FIG. 2) are conducted simultaneously over the same twisted-pair link 28. In the frequency domain, the Power Spectral Density (PSD) of the LS signal is concentrated between baseband and 50 GHz (for a 100 Mbps signal) or between baseband and 5 GHz (for a 10 Mbps signal). The PSD of the 10 Gbps HS signal is concentrated between baseband and 5 GHz. Thus, the spectra of the HS and LS signal overlap at the bottom of the spectrum, and may interfere with one another. As will be shown below, this mutual interference is mitigated by using precoding in the transmitter and decoding in the peer receiver, at least in one direction of the link.

In the embodiment of FIG. 2, PHY transceiver 20 comprises a LS transmitter (LS TX) 32 that is configured to generate and transmit the LS signal over link 28, and PHY transceiver 24 comprises a LS receiver (LS RX) 36 that is configured to receive the LS signal. PHY transceiver 24 comprises a HS transmitter (HS TX) 40 that is configured to generate and transmit the HS signal over link 28, and PHY transceiver 20 comprises a HS receiver (HS RX) 44 that is configured to receive the HS signal.

In an embodiment, LS TX 32 receives input LS data ("LS DATA IN"), typically from an Ethernet Medium Access Control (MAC) device (not shown in the figure for clarity) that is coupled to PHY transceiver 20. LS TX 32 comprises a LS precoder 48 that precodes the input LS data ("LS DATA IN"), and a TX driver 52 that transmits the precoded LS data over link 28. In the present example, LS precoder 48 applies a (1+D) precoding scheme, i.e., delays the input data by one bit using a delay element (D) to produce a delayed replica, and sums the input data and the delayed replica using an adder. The input data values are assumed, without loss of generality, to be ±1.

LS RX 36 comprises an input filter 56, in the present example comprising a combination of a Low-Pass Filter (LPF) and a High-Pass Filter (HPF), which filters the signal received from link 28. In alternative embodiments, other suitable types of filters can be used. LS RX 36 further comprises an Analog-to-Digital Converter (ADC) 60 that digitizes (samples) the filtered signal, an equalizer 64 that equalizes the digitized signal, and a slicer 68 that slices the signal at the equalizer output, i.e., makes bit decisions. In the absence of errors, the bit stream at the output of slicer 68 is identical to the precoded data produced by LS precoder 48. In an embodiment, the output of slicer 68 is fed back to a Digital timing Loop (DTL) 72, which adjusts the sampling clock of ADC 60.

In the embodiment of FIG. 2, LS RX 36 further comprises a LS decoder 76, which recovers the original input data ("LS DATA IN") from the output of slicer 68 (i.e., from the precoded data). LS decoder 76 applies a decoding scheme that is the inverse of (i.e., that reverses) the precoding scheme used by LS precoder 48. In the present example LS decoder 76 applies a (1/(1+D)) decoding scheme by (i) delaying the precoded data by one bit using a delay element (D) so as to produce a delayed replica, (ii) feeding the delayed replica from the output of the delay element back to the input, and (iii) subtracting the delayed replica of the precoded data from the precoded data (or alternatively subtract the precoded data from the delayed replica of the precoded data).

In the absence of errors, the bit stream at the output of LS decoder 76 ("LS DATA OUT") is identical to the original input data ("LS DATA IN"). The "LS DATA OUT" bit stream is provided as the output of LS RX 36, and of PHY transceiver 24 as a whole. The "LS DATA OUT" bit stream is typically delivered to an Ethernet MAC device (not shown in the figure for clarity) that is coupled to PHY transceiver 24.

The (1+D) precoding operation in LS TX 32 has a Low-Pass Filtering effect that reduces the PSD of the LS signal at high frequencies. One simulated example PSD can be seen in U.S. Provisional Patent Application 62/893,070, cited above. As such, the precoding operation reduces interference (e.g., echoes) that might interfere with reception of the HS signal by HS RX 44. At the same time, the precoding operation of LS TX 32 is fully recoverable by the inverse decoding operation of LS RX 36.

In an embodiment, HS TX 40 is provided with input HS data ("HS DATA IN"), typically from an Ethernet MAC device (not shown in the figure) that is coupled to PHY transceiver 24. HS TX 40 comprises a HS precoder 48 that precodes the input HS data ("HS DATA IN"), and a TX driver 84 that transmits the precoded HS data over link 28. In the present example, HS precoder 80 applies a (1-D) precoding scheme, i.e., delays the input data by one bit using a delay element (D) to produce a delayed replica, and subtracts the delayed replica from the input data (or the input data from the delayed replica) using an adder. The input data values are again assumed, without loss of generality, to be ±1.

HS RX 44 comprises an input filter 88, in the present example comprising a combination of a LPF and a HPF, which filters the signal received from link 28. HS RX 44 further comprises an ADC 92 that digitizes (samples) the filtered signal, an equalizer 96 that equalizes the digitized signal, and a slicer 100 that slices the signal at the equalizer output, i.e., makes bit decisions. In the absence of errors, the bit stream at the output of slicer 100 is identical to the precoded data produced by HS precoder 80. In an embodiment, the output of slicer 100 is fed back to a DTL 104 that adjusts the sampling clock of ADC 92.

In the embodiment of FIG. 2, HS RX 44 further comprises a HS decoder 108, which recovers the original input data ("HS DATA IN") from the output of slicer 100 (i.e., from the precoded data). HS decoder 108 applies a decoding scheme that is the inverse of (i.e., that reverses) the precoding scheme used by HS precoder 80. In the present example HS decoder 108 applies a (1/(1-D)) decoding scheme by (i) delaying the precoded data by one bit using a delay element (D) so as to produce a delayed replica, (ii) feeding the delayed replica from the output of the delay element back to the input, and (iii) summing the precoded data and the fed-back delayed replica of the precoded data.

In the absence of errors, the bit stream at the output of HS decoder 108 ("HS DATA OUT") is identical to the original input data ("HS DATA IN"). The "HS DATA OUT" bit stream is provided as the output of HS RX 44, and of PHY transceiver 20 as a whole. The "HS DATA OUT" bit stream is typically delivered to an Ethernet MAC device (not shown in the figure) that is coupled to PHY transceiver 20.

The (1-D) precoding operation in HS TX 40 has a High-Pass Filtering effect that reduces the PSD of the HS signal at low frequencies, near baseband. A simulated example PSD can be seen in U.S. Provisional Patent Application 62/893,070, cited above. As such, the precoding operation reduces interference (e.g., local echoes) that might interfere with reception of the LS signal by LS RX 36. At the same time, the precoding operation of HS TX 40 is fully recoverable by the inverse decoding operation of HS RX 44.

Figure 4:
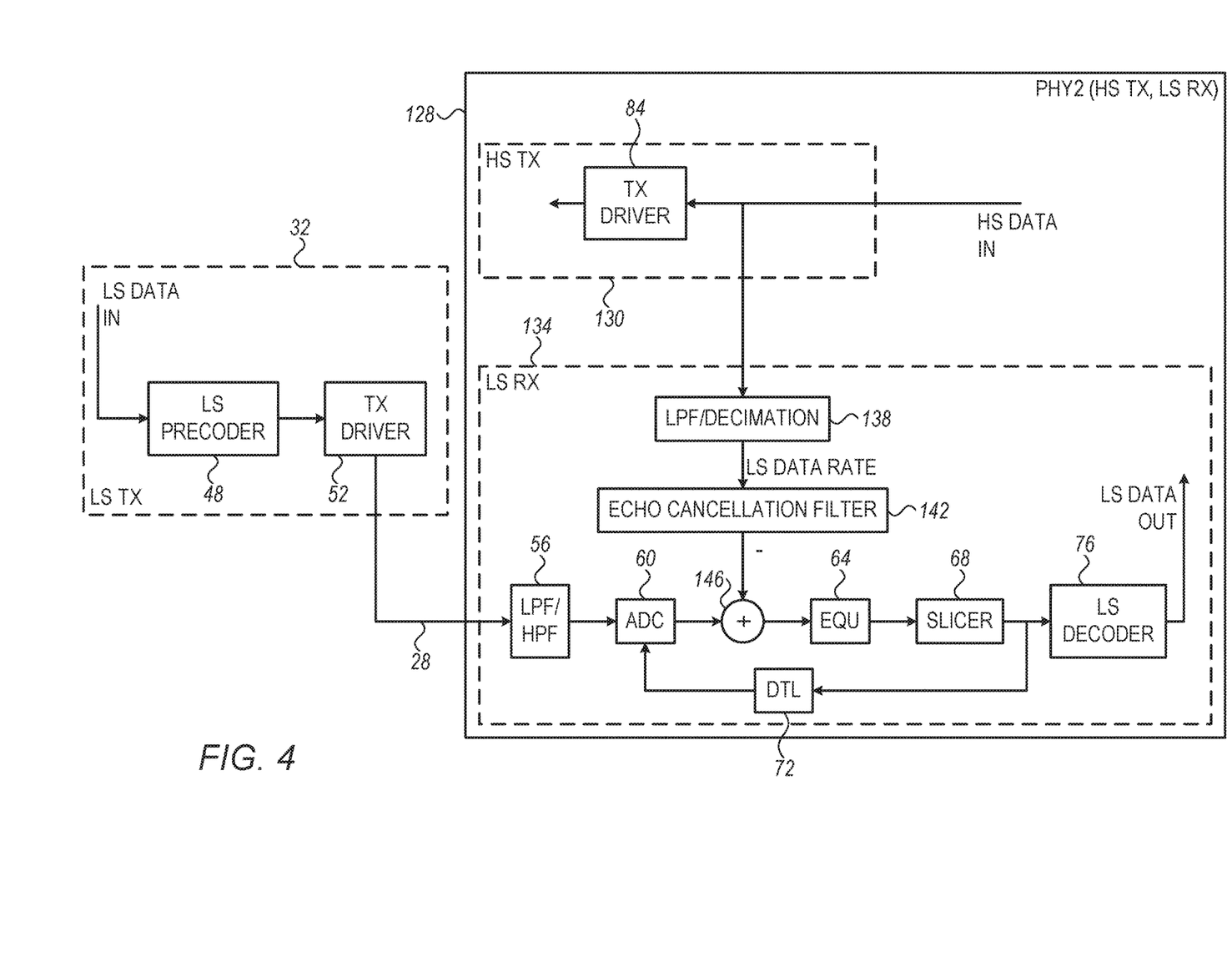
FIG. 4 is a block diagram that schematically illustrates an asymmetric Ethernet PHY transceiver, in accordance with an alternative embodiment that is described herein.

In the example of FIG. 2, precoding is applied both in the LS transmission and in the HS transmission. Consequently, obviating the need for echo cancellation in both PHY transceivers. In alternative embodiments, precoding may be applied only in one direction, with one of the PHY transceivers still performing echo cancellation. An embodiment of this sort is shown in FIG. 4 below.

Figure 3:
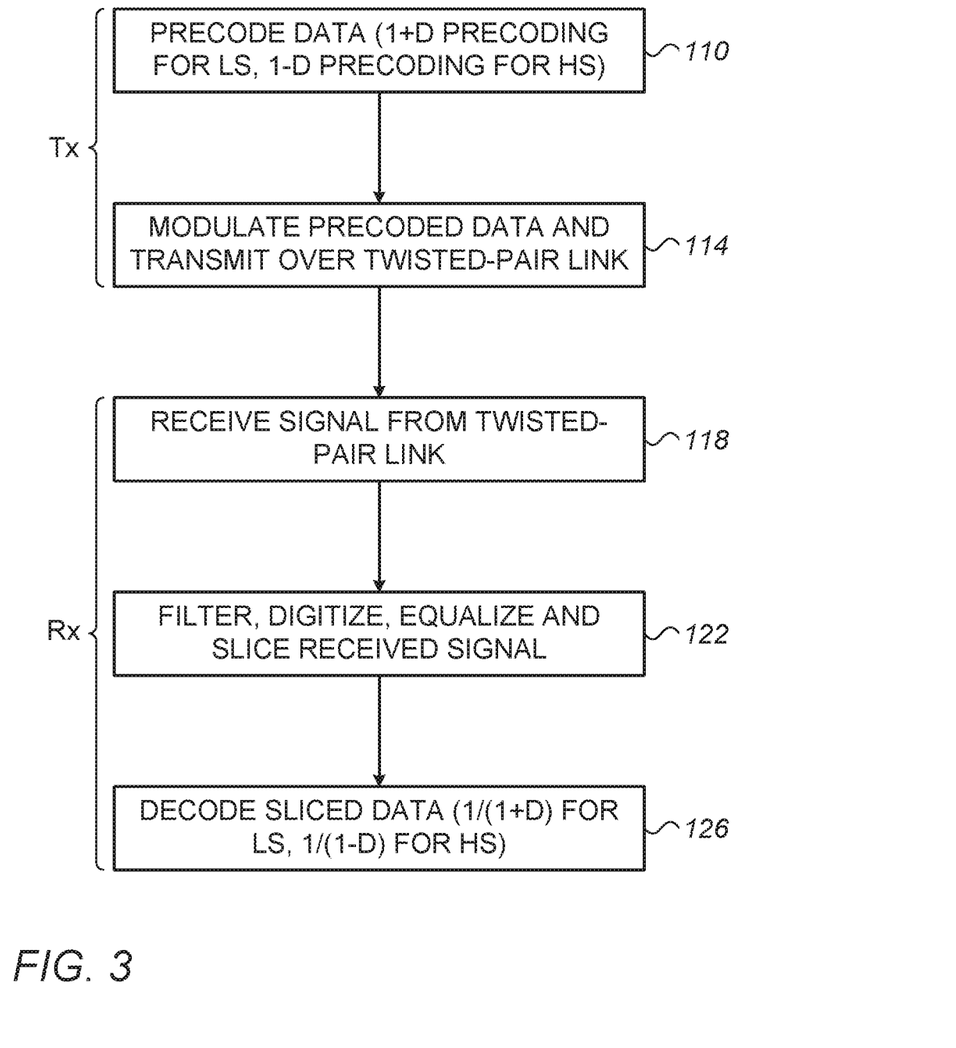
FIG. 3 is a flow chart that schematically illustrates a method for communication between the asymmetric Ethernet PHY transceivers of FIG. 2, in accordance with an embodiment that is described herein.

FIG. 3 is a flow chart that schematically illustrates a method for communication between asymmetric Ethernet PHY transceivers 20 and 24 of FIG. 2, in accordance with an embodiment that is described herein. The method is described in the context of one direction, e.g., LS transmission from LS TX 32 to LS RX 36, or HS transmission from HS TX 40 to HS RX 44.

The method begins with the precoder of the TX (precoder 48 or 80 as appropriate) precoding input data, at a precoding operation 110. In the example of FIG. 2, the precoding scheme is (1+D) for LS transmission and (1-D) for HS transmission. At a transmission operation 114, the TX driver (TX driver 52 or 84 as appropriate) modulates the precoded data and transmits the resulting signal over link 28.

At a reception operation 118, the receiver (LS RX 36 or HS RX 44 as appropriate) receives the signal from link 28. At a receiver-side processing operation 122, the receiver filters, digitizes, equalizes and slices the received signal, as described above. At a decoding operation 126, the decoder of the receiver (decoder 76 or 108 as appropriate) decodes the precoded data provided by the slicer. In the example of FIG. 2, the decoding scheme is (1/(1+D)) for LS transmission and (1/(1-D)) for HS transmission. The decoded data is provided as output.

FIG. 4 is a block diagram that schematically illustrates an asymmetric Ethernet PHY transceiver 128, in accordance with an alternative embodiment that is described herein. In this example, precoding is applied only in the LS TX (of the peer PHY transceiver) and not in the HS TX (of PHY transceiver 128), and thus decoding is applied only in the LS RX (of PHY transceiver 128) and not in the HS RX (of the peer PHY transceiver). Typically, although not necessarily, the precoding scheme is (1+D) and the decoding scheme is (1/(1+D)).

In addition, the PHY device comprising the LS RX performs echo cancellation, for suppressing echoes of the transmitted HS signal that may interfere with the reception of the LS signal. Typically, cancellation of echoes of the HS signal in the LS RX (interference from the signal transmitted by HS TX 130 to reception of the LS signal by LS RX 134, all locally in PHY transceiver 128) incurs only modest computational complexity, since the cancellation is performed at the LS bit rate. Echo cancellation in the opposite direction, i.e., cancellation of echoes of the LS signal in the HS RX, is considerably more complex to implement. Therefore, it is highly desirable to use precoding in the LS transmission.

In the example of FIG. 4, PHY transceiver 128 comprises a HS TX 130 and a LS RX 134. As in the configuration of FIG. 2, the HS bit rate may be 10 G bits per second (10 Gbps), and the LS bit rate may be 100 Mbps or 10 Mbps.

As seen, HS TX 130 of PHY transceiver 128 comprises a TX driver 84, but no precoder. TX driver 84 therefore transmits the "HS DATA IN" bit stream directly over link 28, without precoding. The HS RX in the peer PHY transceiver (not shown in the figure) does not perform decoding of the received HS DATA IN bit stream.

LS RX 134 of PHY transceiver 128 is similar to LS RX 36 (FIG. 2), with the addition of echo cancellation circuitry that is configured to cancel echoes of the HS signal that interfere with reception of the LS signal. Similarly to LS RX 36 of FIG. 2, LS RX 134 receives a precoded LS signal, and applies decoding using LS decoder 76.

In an embodiment, the echo cancellation circuitry in LS RX 134 comprises a LPF/decimation filter 138, an echo cancellation filter 142 and an adder 146. LPF/decimation filter 138 receives a replica of the "HS DATA IN" bit stream from HS TX 130 and performs two functions—(i) low-pass filtering the bit stream, and (ii) reducing the rate of the bit stream from the HS bit rate to the LS bit rate. Echo cancellation filter 142 adjusts the gain and phase of the decimated HS signal, so as to match the gain and phase of the echo of the HS signal at the output of ADC 60. Adder 146 subtracts the output of filter 142 from the output of ADC 60, thereby canceling the echo. The signal provided to equalizer 64 therefore has a reduced level of echo from the HS signal.

In some embodiments, it is sufficient to implement echo cancellation filter 142 with a relatively small number of taps (coefficients), e.g., on the order of sixteen taps, to cancel echoes of the HS signal. The small number of taps also simplifies the coefficient calculation process. For example, for a LS rate of 100 Mbps, two-level pulse-amplitude modulation (PAM2), and a 15-meter long twisted-pair link, as would be suitable for use in a typical automotive network, a 16-tap filter was shown to be sufficient.

The configurations of PHY transceivers 20, 24 and 128 and their components, such the internal structures of the various LS TXs, LS RXs, HS TXs and HS RXs, as shown in FIGS. 1, 2 and 3, are example configurations that are depicted solely for the sake of clarity. In alternative embodiments, any other suitable configurations can be used. For example, the (1+D) and (1-D) precoding schemes described above have been chosen purely by way of example. Alternatively, any other suitable precoding schemes can be used. Generally, the precoding operation can be implemented by summing two or more mutually-delayed replicas of the input data stream. The term "mutually-delayed" does not necessarily mean that all of the replicas are delayed; in each of the (1+D) and (1-D) schemes, for example, one replica is delayed and the other replica is not.

The different elements of PHY transceivers 20, 24 and 128 and their components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of PHY transceivers 20, 24 and 128, e.g., functions of LS precoder 48, LS decoder 76, HS precoder 80 and/or HS decoder 108, may be implemented in software and/or using a combination of hardware and software elements. Elements that are not mandatory for understanding of the disclosed techniques have been omitted from the figure for the sake of clarity. For example, each PHY transceiver typically comprises a Media Dependent Interface (MDI) for coupling the transmitter and receiver to link 28.

In some embodiments, some functions of PHY transceivers 20, 24 and 128, e.g., functions of LS precoder 48, LS decoder 76, HS precoder 80 and/or HS decoder 108, may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Ethernet physical layer (PHY) transceiver, comprising:
a transmitter, configured to generate and transmit a first signal carrying a first data stream over an asymmetric full-duplex wired channel to a peer Ethernet PHY transceiver;
a receiver, configured to receive a second signal carrying a second data stream from the peer Ethernet PHY transceiver over the asymmetric full-duplex wired channel, the second signal containing an echo component from the first signal, and to decode the received second data stream; and
a precoder, which is configured, in generating the first signal for transmission, to apply precoding to the first data stream, the precoding reducing the echo component from the first signal in the second data stream decoded by the receiver.

2. The Ethernet PHY transceiver according to claim 1, wherein the precoder is configured to apply the precoding to the first data stream by (i) delaying the first data stream so as to produce a delayed replica, and (ii) summing the first data stream and the delayed replica.

3. The Ethernet PHY transceiver according to claim 1, wherein the precoder is configured to apply the precoding to the first data stream by (i) delaying the first data stream so as to produce a delayed replica, and (ii) subtracting the delayed replica from the first data stream, or the first data stream from the delayed replica.

4. The Ethernet PHY transceiver according to claim 1, wherein the transmitter is configured to transmit the first data stream at a first data rate, and wherein the receiver is configured to receive the second data stream at a second data rate, higher than the first data rate.

5. The Ethernet PHY transceiver according to claim 1, wherein the receiver is configured to receive and decode the precoded second data stream without concurrently cancelling echoes of the first data stream.

6. The Ethernet PHY transceiver according to claim 1, wherein the transmitter and the receiver are configured to communicate the first data stream and the second data stream between electronic units in a vehicle.

7. The Ethernet PHY transceiver according to claim 1, wherein the transmitter is configured to apply the precoding by summing two or more mutually-delayed replicas of the first data stream.

8. An Ethernet physical layer (PHY) transceiver, comprising:
a receiver, configured to:
receive a first signal carrying a first data stream from a peer Ethernet PHY transceiver over an asymmetric full-duplex wired channel, wherein the first data stream is precoded using a precoding scheme; and
decode the received first data stream, the decoding including applying to the first data stream a decoding scheme that reverses the precoding scheme; and
a transmitter, configured to transmit a second signal carrying a second data stream over the asymmetric full-duplex wired channel to the peer Ethernet PHY transceiver while the receiver concurrently is receiving the first signal and decoding the first data stream, wherein the second signal, received by the peer Ethernet PHY transceiver, contains an echo component from the first signal transmitted by the peer Ethernet PHY transceiver, and wherein the precoding scheme reduces the echo component from the first signal in the second data stream decoded by the peer Ethernet PHY transceiver.

9. The Ethernet PHY transceiver according to claim 8, wherein the receiver is configured to decode the first data stream by (i) delaying the first data stream by a delay element, so as to produce a delayed replica, (ii) feeding the delayed replica from an output of the delay element back to an input of the delay element, and (iii) subtracting the delayed replica from the first data stream, or the first data stream from the delayed replica.

10. The Ethernet PHY transceiver according to claim 8, wherein the receiver is configured to decode the first data stream by (i) delaying the first data stream by a delay element, so as to produce a delayed replica, (ii) feeding the delayed replica from an output of the delay element back to an input of the delay element, and (iii) summing the delayed replica and the first data stream.

11. The Ethernet PHY transceiver according to claim 8, wherein the receiver is configured to receive the first data stream at a first data rate, and wherein the transmitter is configured to transmit the second data stream at a second data rate, higher than the first data rate.

12. The Ethernet PHY transceiver according to claim 8, wherein the receiver is configured to receive and decode the precoded first data stream without concurrently cancelling echoes of the second data stream.

13. The Ethernet PHY transceiver according to claim 8, wherein the transmitter and the receiver are configured to communicate the first data stream and the second data stream between electronic units in a vehicle.

14. An Ethernet physical layer (PHY) communication method, comprising:
  generating and transmitting a first signal carrying a first data stream over an asymmetric full-duplex wired channel;
  receiving a second signal carrying a second data stream over the asymmetric full-duplex channel, the second signal containing an echo component from the first signal, and decoding the received second data stream; and
  in generating the first signal, applying, to the first data stream, a precoding that reduces the echo component from the first signal in the second signal.

15. The Ethernet PHY communication method according to claim 14, wherein applying the precoding comprises (i) delaying the first data stream so as to produce a delayed replica, and (ii) summing the first data stream and the delayed replica.

16. The Ethernet PHY communication method according to claim 14, wherein applying the precoding comprises (i) delaying the first data stream so as to produce a delayed replica, and (ii) subtracting the delayed replica from the first data stream, or the first data stream from the delayed replica.

17. The Ethernet PHY communication method according to claim 14, wherein transmitting the first data stream comprises transmitting the first data stream at a first data rate, and wherein receiving the second data stream comprises receiving the second data stream at a second data rate, higher than the first data rate.

18. The Ethernet PHY communication method according to claim 14, wherein receiving and decoding the precoded second data stream is performed without concurrently cancelling echoes of the first data stream.

19. The Ethernet PHY communication method according to claim 14, wherein applying the precoding comprises summing two or more mutually-delayed replicas of the first data stream.

20. An Ethernet Physical layer (PHY) communication method, comprising:
  receiving, from a peer Ethernet PHY communication transceiver, a first signal carrying a first data stream over an asymmetric full-duplex wired channel, wherein the first data stream is precoded using a precoding scheme;
  decoding the received first data stream, the decoding including applying to the first data stream a decoding scheme that reverses the precoding scheme; and
  transmitting, to the peer Ethernet PHY communication transceiver, a second signal carrying a second data stream over the asymmetric full-duplex channel while the first signal is received and the first data stream concurrently is decoded,
  wherein the second signal, when received by the peer Ethernet PHY transceiver, contains an echo component from the first signal transmitted by the peer Ethernet PHY transceiver, and wherein the precoding scheme reduces the echo component from the first signal in the second data stream decoded by the peer Ethernet PHY transceiver.

21. The Ethernet PHY communication method according to claim 20, wherein decoding the first data stream comprises (i) delaying the first data stream by a delay element, so as to produce a delayed replica, (ii) feeding the delayed replica from an output of the delay element back to an input of the delay element, and (iii) subtracting the delayed replica from the first data stream, or the first data stream from the delayed replica.

22. The Ethernet PHY communication method according to claim 20, wherein decoding the first data stream comprises (i) delaying the first data stream by a delay element, so as to produce a delayed replica, (ii) feeding the delayed replica from an output of the delay element back to an input of the delay element, and (iii) summing the delayed replica and the first data stream.

23. The Ethernet PHY communication method according to claim 20, wherein receiving the first data stream comprises receiving the first data stream at a first data rate, and wherein transmitting the second data stream comprises transmitting the second data stream at a second data rate, higher than the first data rate.

24. The Ethernet PHY communication method according to claim 20, wherein receiving and decoding the precoded first data stream is performed without concurrently cancelling echoes of the second data stream.

* * * * *

UNITED STATES PATENT AND TRADEMARK OFFICE
CERTIFICATE OF CORRECTION

| | |
|---|---|
| PATENT NO. | : 11,483,024 B2 |
| APPLICATION NO. | : 17/004027 |
| DATED | : October 25, 2022 |
| INVENTOR(S) | : Shaoan Dai, Xing Wu and Mats Oberg |

It is certified that error appears in the above-identified patent and that said Letters Patent is hereby corrected as shown below:

On the Title Page

Item (54) and in the Specification, Column 1, Lines 1-2:
The title should read "PRECODING FOR ASYMMETRIC TWO-WAY ETHERNET PHYSICAL LAYER".

Signed and Sealed this
Twenty-eighth Day of March, 2023

*Katherine Kelly Vidal*

Katherine Kelly Vidal
*Director of the United States Patent and Trademark Office*